(12) United States Patent
Sun et al.

(10) Patent No.: US 7,849,104 B2
(45) Date of Patent: Dec. 7, 2010

(54) SEARCHING HETEROGENEOUS INTERRELATED ENTITIES

(75) Inventors: Jian-Tao Sun, Beijing (CN); Xuanhui Wang, Champaign, IL (US); Ning Liu, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 579 days.

(21) Appl. No.: 11/853,613

(22) Filed: Sep. 11, 2007

(65) Prior Publication Data

US 2008/0215565 A1 Sep. 4, 2008

Related U.S. Application Data

(60) Provisional application No. 60/892,528, filed on Mar. 1, 2007.

(51) Int. Cl.
*G06F 7/00* (2006.01)

(52) U.S. Cl. ............ 707/798; 707/797; 707/791

(58) Field of Classification Search ........ 707/3, 707/5, 1, 2, 798, 797, 791
See application file for complete search history.

(56) References Cited

U.S. PATENT DOCUMENTS

| | | | |
|---|---|---|---|
| 5,873,079 A | 2/1999 | Davis, III et al. | |
| 5,956,720 A * | 9/1999 | Fernandez et al. | 707/10 |
| 5,970,490 A | 10/1999 | Morgenstern | |
| 6,370,541 B1 | 4/2002 | Chou et al. | |
| 7,624,081 B2 * | 11/2009 | Zhao et al. | 706/20 |
| 2004/0220944 A1 * | 11/2004 | Behrens et al. | 707/100 |
| 2005/0234952 A1 * | 10/2005 | Zeng et al. | 707/101 |
| 2005/0234972 A1 * | 10/2005 | Zeng et al. | 707/103 R |
| 2005/0256832 A1 * | 11/2005 | Zhang et al. | 707/1 |
| 2006/0112146 A1 * | 5/2006 | Song et al. | 707/200 |
| 2007/0239677 A1 * | 10/2007 | Zhao et al. | 707/3 |

OTHER PUBLICATIONS

PCT Search Report for PCT Application No. PCT/US2008/055580, mailed Jul. 31, 2008 (12 pages).

* cited by examiner

*Primary Examiner*—Apu M Mofiz
*Assistant Examiner*—Cindy Nguyen
(74) *Attorney, Agent, or Firm*—Lee & Hayes, PLLC

(57) ABSTRACT

Systems and methods for searching heterogeneous interrelated entities for a heterogeneous entities search query are disclosed herein. A user may enter the heterogeneous entities search query. The search retrieves and returns multiple types of heterogeneous entities. The retrieved heterogeneous interrelated entities are searched in a unified matrix that represents relationships between one or more heterogeneous entities. The retrieved heterogeneous interrelated entities may have one or more entity types. The set of retrieved interrelated entities may also be ranked based on the similarity between each entity and the search query. Feedback may also be incorporated into the system to improve search accuracy.

16 Claims, 11 Drawing Sheets

400

```
┌─────────────────────────────────────────────────────┐
│  CONSTRUCT A MULTIPLE TYPE GRAPH FOR ALL HETEROGENEOUS │
│                  ENTITIES TYPES                      │
│                      402                             │
└─────────────────────────────────────────────────────┘
                          ↓
┌─────────────────────────────────────────────────────┐
│  EXTRACT CO-OCCURRENCE MATRICES FROM MULTIPLE TYPE GRAPH │
│                      404                             │
└─────────────────────────────────────────────────────┘
                          ↓
┌─────────────────────────────────────────────────────┐
│   REPRESENT EACH ENTITY AS AN ENTITY VECTOR USING CO- │
│                OCCURRENCE MATRICES                   │
│                      406                             │
└─────────────────────────────────────────────────────┘
                          ↓
┌─────────────────────────────────────────────────────┐
│      CONSTRUCT A UNIFIED MATRIX USING ENTITY VECTORS │
│                      408                             │
└─────────────────────────────────────────────────────┘
                          ↓
┌─────────────────────────────────────────────────────┐
│ PRESENT A SEARCH INTERFACE TO ACCEPT QUERY AND RETRIEVE LIST │
│       OF HETEROGENEOUS INTERRELATED ENTITIES         │
│                      410                             │
└─────────────────────────────────────────────────────┘
```

ACCEPT A SEARCH QUERY
602

SEARCH HETEROGENEOUS INTERRELATED ENTITIES
604

RANK THE RESULTS OF THE SEARCH
606

PRESENT THE RANKED RESULTS
608

```
┌─────────────────────────────────────────────────────────┐
│  REPRESENT SEARCH QUERY AS A VECTOR IN THE UNIFIED MATRIX │
│                          702                             │
└─────────────────────────────────────────────────────────┘
                            │
                            ▼
┌─────────────────────────────────────────────────────────┐
│   FORM PAIRS OF SEARCH QUERY VECTORS WITH ENTITY VECTORS │
│                          704                             │
└─────────────────────────────────────────────────────────┘
                            │
                            ▼
┌─────────────────────────────────────────────────────────┐
│  CALCULATE DOT PRODUCT OF THE VECTORS FOR EACH PAIR TO   │
│              EVALUATE SIMILARITY SCORE                   │
│                          706                             │
└─────────────────────────────────────────────────────────┘
                            │
                            ▼
┌─────────────────────────────────────────────────────────┐
│        RANK THE ENTITIES BASED ON THE SIMILARITY SCORE   │
│                          708                             │
└─────────────────────────────────────────────────────────┘
```

CONSTRUCT A UNIFIED MATRIX FOR ALL TYPES OF HETEROGENEOUS INTERRELATED ENTITIES
802

USE FEEDBACK MECHANISM TO FIND A SET OF SEMANTICALLY INTERRELATED ENTITIES
804

CALCULATE EXPANDED QUERY VECTOR
806

USE THE EXPANDED QUERY VECTOR TO RETRIEVE AND RANK REFINED RESULTS
808

Keywords: data mining
Conference:
Author:

[Search] 902

| Paper | | Author | | Conference | | Keywords | |
|---|---|---|---|---|---|---|---|
| Data mining: are we there yet? | 0.000422 | Jiawei Han | 0.021653 | KDD | 0.076072 | data | 1.480887 |
| Data Mining: What it is and how it is done | 0.000422 | Philip S Yu | 0.011713 | PAKDD | 0.051155 | mine | 1.085893 |
| OLAP Mining: Integration of OLAP with Data Mining | 0.000421 | Mohammed Javeed Zaki | 0.009822 | ICDM | 0.046427 | base | 0.237723 |
| Speed-up Mining or "Why is Data Mining Iterative? | 0.000421 | Jian Pei | 0.009435 | VLDB | 0.039430 | system | 0.161881 |
| What Data Is Necessary to Data Mine for Knowledge? | 0.000414 | Masaru Kitsuregawa | 0.009420 | PKDD | 0.036405 | rule | 0.153623 |
| BioImage Data Mining and Informatics. | 0.000413 | Rakesh Argrawal | 0.008912 | ICDE | 0.035125 | model | 0.136046 |
| Mining the Data Stream. | 0.000413 | Wei Wang | 0.008677 | SIGMOD Conference | 0.028449 | web | 0.133642 |
| "Data Mining": in chemistry. | 0.000413 | Christos Faloutsos | 0.008591 | CIKM | 0.018651 | associate | 0.132924 |
| Mining Unstructured Data. | 0.000413 | Ming-Syan Chen | 0.008166 | DaWaK | 0.018308 | pattern | 0.119339 |
| Mining Astronomical Data. | 0.000413 | Srinivasan Parthasarathy | 0.007402 | HICSS | 0.017592 | database | 0.113753 |

Query: [_____] e.g. "xbox"
URL: [www.xbox.com] e.g. "www.xbox.com"
Words: [_____] e.g. "ps2"  [Search]

| Query | | URL | | Words | |
|---|---|---|---|---|---|
| www.xbox.com | 0.218850 | www.xbox.com | 1.000000 | xbox | 0.455406 |
| xbox.com | 0.212959 | Xbox 360 : Official Site, For Xbox and Xbox 360, News updates, game trailers, screens and more | 0.375416 | 360 | 0.140488 |
| xbox live | 0.205624 | consumerrewardzone.com | 0.375416 | update | 0.111625 |
| xbox | 0.199987 | Free Designer Diaper Bag!,Kate Spade or Juice Conture, New Promo Enter Zip Code for Availability | 0.347932 | screen | 0.106777 |
| xbox nn360 | 0.195610 | www.ebay.com | 0.347932 | trailer | 0.101229 |
| xbox360 | 0.156732 | e Bay – Official Site, Buy and Sell Anything on e Bay. Bid Online Today for Free! | 0.339484 | news | 0.090576 |
| games xbox | 0.070133 | shop.com | 0.339484 | game | 0.081143 |
| xbox game | 0.070133 | Shop.com – Official Site, Find hundreds of merchants, thousands of brands, millions of products. | 0.301999 | live | 0.064693 |
| xbox games | 0.070133 | www.xboxdirect.biz | 0.246605 | xbox 360 | 0.063346 |
| xbox nn360 games | 0.051647 | Xbox Direct, thousands of brand new, factory sealed Xbox 360 game systems in stock! | 0.235811 | nn 360 | 0.052160 |
| internet explorer update | 0.051647 | shopping.msn.com | 0.235811 | | |
| microsoft update | 0.051647 | MSN Shopping: Great Deals, Get great deals on digital cameras & home electronics at MSN Shopping. | 0.229941 | | |
| microsoft updates | 0.051647 | xbox360unlimited.com | 0.229941 | | |
| microsoft windows update | 0.051647 | Xbox 360 Unlimited, Xbox 360 is here. Do you have one? See our Xbox 360 directory today. | | | |
| office updates | 0.051647 | bizrate.com | | | |
| update | 0.051647 | Compare Prices at BizRate, Compare Prices & Save Money Online. Pay US A Visit. You'll Pay Less. | | | |
| update windows | 0.051647 | | | | |
| updates | 0.051647 | | | | |
| windows update | 0.051647 | | | | |
| windows updates | 0.051647 | | | | |

FIG. 10

SEARCHING HETEROGENEOUS INTERRELATED ENTITIES

CROSS REFERENCE TO RELATED APPLICATIONS

This application claims the priority to, and the benefit of, U.S. Provisional Application No. 60/892,528 filed Mar. 1, 2007, titled "Searching Heterogeneous Interrelated Entities."

BACKGROUND

Activity on the World Wide Web ("Web") involves heterogeneous entities such as end users, web pages, search queries, and keywords. These entities may be referred to in the search context as objects. The objects may be interrelated by virtue of having similar content or by some other relationship. Traditional searches performed using search engines, such as commercial web search engines, generally deal with single types of objects, such as web pages or documents.

Most of these traditional search services generally take a search query as input from a user and display a ranked list of web pages as a search result. However, the user may desire more robust information such as a list of possible words that may be used to refine the submitted query for more accurate results, a list of users who have searched for the same keyword, and even web pages related to a specific web page. Only searching single types of objects tends to limit the information provided to the end user and, therefore, reduces the accuracy and value of the search results.

SUMMARY

This summary is provided to introduce simplified concepts of searching heterogeneous interrelated entities for a heterogeneous entities search query, which is further described below in the Detailed Description. Implementations for searching heterogeneous interrelated entities based on a heterogeneous entities search query are described.

In one implementation, a user may enter a search query having one or more heterogeneous entities through an input interface. In response to the query, a set of search results may be retrieved from a unified space. The unified space represents relationships between all the heterogeneous entities, each of which belongs to an entity type. Results of the search may then be presented to the user as a list or series of lists of heterogeneous interrelated entities.

This summary is provided to introduce a selection of concepts in a simplified form to be further described below in the Detailed Description. This summary is not intended to identity key features or essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 4 illustrates exemplary method(s) for creating a unified space model for implementing searching of heterogeneous interrelated entities.

FIG. 6 illustrates exemplary method(s) for searching and ranking heterogeneous entities.

FIG. 7 illustrates exemplary method(s) for ranking heterogeneous interrelated entities.

FIG. 8 illustrates exemplary method(s) for improving search accuracy using feedback mechanisms.

FIG. 9 illustrates an example of the presentation of search results of heterogeneous interrelated entities including paper, author, conference, and keyword entities.

FIG. 10 illustrates an example of the presentation of search results of heterogeneous interrelated entities including variations of the query and/or related queries, URL's, papers, and words.

DETAILED DESCRIPTION

This disclosure is directed to techniques for searching heterogeneous entities over a network, such as the World Wide Web. More particularly, the techniques involve searching for a set of heterogeneous interrelated entities having multiple entity types based on a heterogeneous entities search query.

The described systems and methods relate to searching heterogeneous entities over a network, such as the World Wide Web, for a search query. The heterogeneous entities may be interrelated by virtue of having similar content or by some other relationship. For example, the heterogeneous entities such as authors, papers, conferences, and keywords involved in a literature search may be interrelated because a given keyword may appear in a given paper as well as be the subject of a particular conference. Thus, a search for a heterogeneous entity of a specific type may be used to retrieve multiple interrelated heterogeneous entities of different types.

It thus becomes feasible for end users to specify their information need along different dimensions by providing queries that include different entity types. In addition, search results that include multiple types of entities provide informative context for users to better understand the search results and facilitate their information exploration. Still further, multiple relations among heterogeneous entities may be utilized to evaluate the relevance and rank of a particular type of entity.

Toward this end, the systems and methods receive a search query as an input using an interface such as a graphical user interface. The search query may include multiple entities of one or more entity types. For each entity in the search query, a search is conducted in a unified space of heterogeneous interrelated entities to retrieve results, also in the form of heterogeneous interrelated entities. The unified space represents relationships between heterogeneous entities of multiple types.

The retrieved heterogeneous interrelated entities may thus include one or more entity types. The results of the search may then be presented to the user as a list or a series of lists of heterogeneous interrelated entities classified based on the entity type. The results of the search may also be ranked based on the relevancy, date, or other criterion before being presented to the user. Furthermore, the results of the search may also be refined using a feedback mechanism.

Multiple and varied implementations are described below. For example, the following section describes an exemplary environment that is suitable for practicing various implementations. Also described are representative implementations of systems, devices, and processes for implementing searching heterogeneous interrelated entities for a search query.

Exemplary Computing Environment

Figure 1:
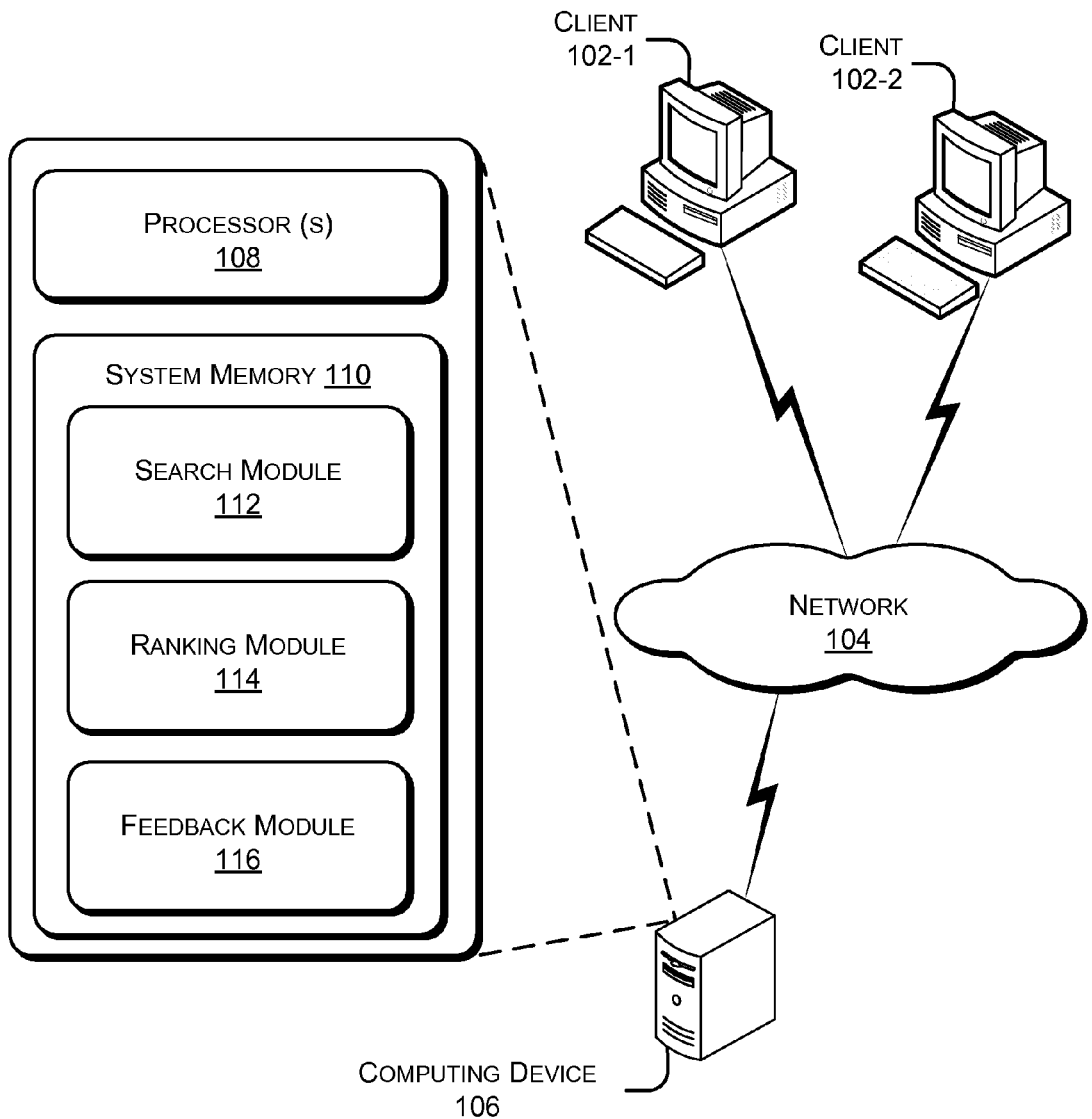
FIG. 1 illustrates an exemplary system architecture implementing techniques for searching heterogeneous interrelated entities.

FIG. 1 shows an exemplary environment 100 that is suitable for implementing techniques for searching heterogeneous interrelated entities for a search query. For discussion purposes, the environment 100 may be a system that includes one or more client devices 102-1, 102-2 . . . 102-n, collectively referred to as 102 hereinafter, communicatively linked through a network 104 to each other and to the computing device 106.

The client device 102 may be implemented as a variety of conventional computing devices including, for example, a server, a desktop PC, a notebook or portable computer, a workstation, a mainframe computer, a mobile computing device, an Internet appliance, a network router, etc. or a combination thereof that are configurable to search and present results for a search query from the network 104.

The network 104 may be a wireless or a wired network, or a combination thereof. The network 104 may be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may be wireless or wired networks, or a combination thereof.

The computing device 106, may be implemented as a variety of conventional computing devices including, for example, a server, a desktop PC, a notebook or portable computer, a workstation, a mainframe computer, a mobile computing device, an Internet appliance, a network router, etc. or a combination thereof that are configurable to implement searching heterogeneous interrelated entities, ranking search results, and using feedback to improve search results using the network 104.

In one embodiment, the computing device 106 includes a processor 108 coupled to a memory 110. The memory 110 includes a search module 112, a ranking module 114 and a feedback module 116. The memory 110 may be coupled to, associated with, and/or accessible to other devices, such as network servers, router, and/or other computing devices 106. When a particular client device 102 sends a search query through the network 104, the computing device 106 processes the search query and returns a set of results, which may include multiple heterogeneous interrelated entities for the search query. The heterogeneous entities, also referred to as data objects or objects, include entities such as end users, search queries, and keywords.

The search module 112 receives a search query as input from a graphical user interface and, in response to the query, the search module may retrieve and return heterogeneous interrelated entities of multiple types. The retrieved entities may include similar and related content to the search query. For this, the search module 112 may search for the heterogeneous related entities in a unified space representation of various heterogeneous related entities of multiple types. In one implementation, the search module 112 first represents the various available heterogeneous entities in the unified space as explained in detail later. Then the search module 112 searches for queried heterogeneous entities in the unified space representation to retrieve multiple interrelated entities as results. For example, a search query "xbox" may give multiple entity types such as relevant users, Web pages, text-queries, related words, competitors as results.

The ranking module 114 ranks the heterogeneous interrelated entities retrieved for the search query by the search module 112 based on the similarity between the search query and the entities. For example, the search query may include a set of words that correspond to entities having one or more entity types. Each such entity may be ranked based on criteria such as similarity, date or other criterion. The ranked results may then be sorted into lists based on the entity types and may be presented to the user.

In one implementation, the results are further refined using the feedback module 116. The feedback module 116 receives the search query as input and finds semantically related entities corresponding to the search query using feedback mechanisms. The feedback mechanisms used to find semantically related entities are either based on entities pre-judged by users or on the first few highly ranked results retrieved by the search module 112. An expanded query is formed based on the semantically related entities, the search query, and a set of weighting factors. The expanded query may be used to retrieve and rank all the entities again to get refined results.

Results of the search thus obtained, including the heterogeneous interrelated entities for the search query, may be presented to the user as lists or a series of lists.

Exemplary Device

Figure 2:
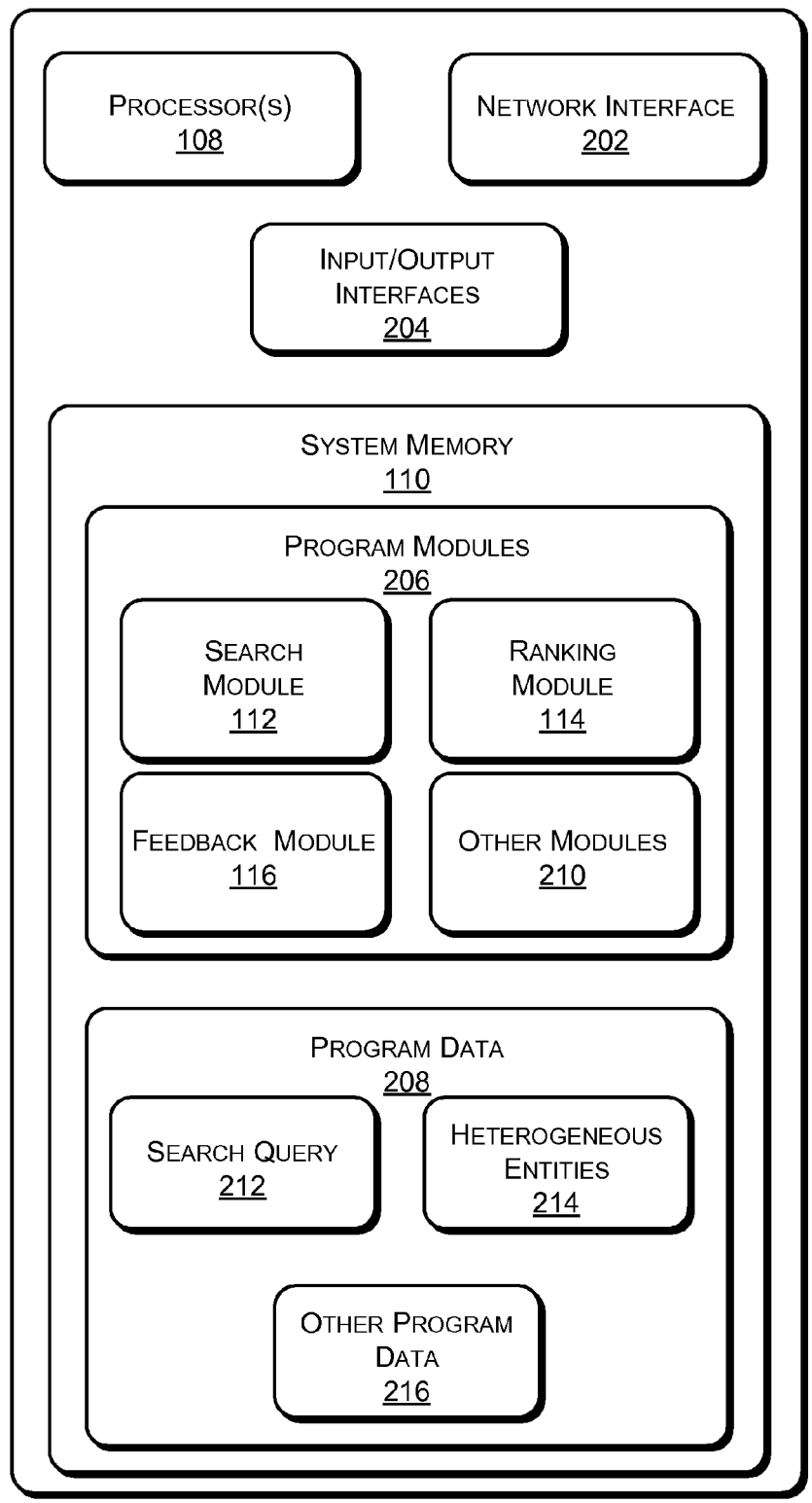
FIG. 2 illustrates an exemplary computing device for searching heterogeneous interrelated entities.

FIG. 2 illustrates various components of an exemplary computing device, such as computing device 106, shown in FIG. 1. In one embodiment, the computing device 106 may include, but is not limited to, a processor 108, a network interface 202, a system memory 110, and an input/output interface 204.

The network interface 202 enables the computing device 106 to receive a search query from the client device 102 over the network 104. For example, the network interface 202 may be used by the computing device 106 to return results of the search over the network 104 to one or more client devices 102 using a graphical user interface.

The memory 110 includes computer-readable media in the form of volatile memory, such as Random Access Memory (RAM) and/or non-volatile memory, such as Read Only Memory (ROM) or flash RAM. The memory 110 typically includes data and/or program modules for searching heterogeneous interrelated entities for a search query in which interrelated entities are immediately accessible to and/or operated on by the processor 108.

In one implementation, the memory 110 includes program module 206 and program data 208. The program modules 206 include the search module 112, the ranking module 114, the feedback module 116 and other modules 210. The other modules 210 may include other software that assists in the functioning of the computing device 106, such as the Operating Systems. The program data 208 includes search queries 212, heterogeneous entities 214 and other data 216 specific to the system or the applications.

The search module 112 receives a heterogeneous interrelated entities search query as input and may then retrieve and return various types of heterogeneous entities. The heterogeneous interrelated entities search query may be any combination of entities of different entity types. A query Q may be of the format $Q:=[t_i:ID_i]_{i=1 \ldots k}$, where k is the number of entities in query Q. The term $[t_i:ID_i]$ indicates the type of i-th entity in $Q(t_i)$ and its identifier $(ID)_i$. For example, in a literature search task, the query Q:=[author: Jiawei Han; word: mining] is a combination of two entities. The first entity is an author and its identifier is Jiawei Han, whereas the second entity is a word and its identifier is mining.

The search module 112 receives the heterogeneous interrelated entities search query and may then return multiple types of heterogeneous interrelated entities including relevant users, Web pages, text-queries, related words, and so forth. For example, a heterogeneous interrelated entities search query using "xbox" as the keyword may return results including relevant users, Web pages, text-queries, related words and so forth. A user may alternatively input a Web page query such as "www.xbox.com" and receive similar results because the Web page and keyword are interrelated.

For this, the search module 112 may search for the received query in a unified space representation of available heterogeneous entities. The unified space represents the relationships between the available heterogeneous entities and may be constructed based on a multiple-type graph G(V, E) of N vertices, with the i-th vertex corresponding to the i-th type of entities $X_i$. The graph thus includes N types of entities $\{X_1, X_2, \ldots, X_N\}$. If two types of entities have an interaction relationship, there is one edge $e_{ij} \epsilon E$ connecting the i-th and j-th vertices.

Each interaction relationship may be derived from the graph and represented as a co-occurrence matrix with each entry measuring the correlation strength between two corresponding entities. For example, the interaction between words and documents may be represented by a co-occurrence matrix, with each entry in the matrix measuring the word importance for the corresponding document. The documents may be represented as columns and the words may be represented as rows. Each column denoting a specific document having document entity type makes an entry based on whether the word exists in the document. In this way, each edge $e_{ij}$ in a multiple-type graph corresponds to a $|X_i| \times |X_j|$ matrix $M_{ij}$ and it may have a weight $\alpha_{ij}$ reflecting the relative importance of its co-occurrence matrix, where $|X_i|$ denotes the number of entities of type $X_i$.

The multiple-type graph thus encodes the semantics of all the interactions among heterogeneous entities. Semantically related entities may directly co-occur with each other or with other types of entities. For example, in a literature search, two researchers may be directly related because they have co-authored papers. The authors may also be implicitly related because their papers are published. These interactions may assist in answering a query with semantically related entities.

Given a query Q and a multiple-type graph G in a unified space representation, the search module 112 may retrieve several lists of relevant entities as search results. All the entities in each list are of the same type and ranked by relevance with respect to Q.

Table 1 presents a mock up result example of a given query Q:=[author:Jiawei Han; word:mining] in a literature search task. Here there are 4 types of entities i.e. papers, authors, conferences and keywords. Thus, the results are presented as 4 lists. Each list may be ranked according to the relevance of the entities within the list with respect to the query Q. For example, the first conference is KDD, which is the most relevant conference to the query Q and the first keyword is "pattern", which is the most relevant keyword.

TABLE 1

An example of heterogeneous interrelated entities search results in a literature search application.

| Papers | Authors | Conferences | Keywords |
|---|---|---|---|
| p1 | Philip Yu | KDD | pattern |
| p2 | Xifeng Yan | SIGMOD | association |

In one implementation, the search module 112 may represent all the heterogeneous entities in a unified framework. Within this framework, all entities are represented in a unified space. Thus, the relevance between any two entities (even in different types) may be measured in this space.

An Extended Vector Space Model (E-VSM) is used to represent all heterogeneous entities in a unified space. E-VSM is an extension of the traditional vector space model. In the traditional vector space model, given a term by document co-occurrence matrix $A=[a_{ij}]$, each document is represented by a word space, which corresponds to a column vector in A, and each word is represented in a document space, which corresponds with a row vector in A. To seek a unified space to represent both documents and words, the two spaces spanned by words and documents may be concatenated to thereby represent each entity (document or word) by a unified longer vector. By filling zeroes in the missing dimensions of each entity, the following unified matrix is obtained:

$$\begin{bmatrix} 0 & A \\ A^T & 0 \end{bmatrix}$$

However, this kind of representation is of little value since the word and document have no overlapped dimensions with nonzero values, and thus their similarity score is still zero in this space. The two zero matrices may be replaced by the co-occurrence information among documents and among words, respectively. In the worst case, where this co-occurrence information is not available, an entity co-occurs with itself by default and the zero matrix may thus be replaced by the identity matrix I. The unified representation may then be expressed as:

$$U = \begin{bmatrix} I & A \\ A^T & I \end{bmatrix}$$

Each row in the upper part of the unified matrix given above is a document representation vector and each row in the lower part is a word representation vector.

Similarly, the search module 112 may construct a unified matrix for any multiple-type graph. On a multiple-type graph, each type of entity co-occurs with other types of entities. Similar to the document and word representations in a Vector Space Model, an entity may be represented by several vectors. Each vector corresponds to a type of entity that co-occurs with the considered entity. Formally, given a multiple-type graph G with N vertices, the i-th type of entities may be represented by the j-th type of entities via a weighting transformation of matrix $M_{ij}.M_{ij}'$. By concatenating all the matrices together, we may represent each entity by a longer vector, thus forming a large matrix $U_0$:

$$U_0 = \begin{bmatrix} 0 & M_{12} & \cdots & M_{1N} \\ M_{21} & 0 & \cdots & M_{2N} \\ \vdots & \vdots & \ddots & \vdots \\ M_{N1} & M_{N2} & \cdots & 0 \end{bmatrix}$$

Each row of $U_0$ is a vector representation for an object or entity. Note that $M_{ij}'$ is not necessarily equal to $M_{ij}'^T$ since they may use different transformation. It may be assumed that each entity co-occurs with itself by default. Then, a unified matrix $U_1$ is obtained:

$$U_1 = \begin{bmatrix} I & M_{12} & \cdots & M_{1N} \\ M_{21} & I & \cdots & M_{2N} \\ \vdots & \vdots & \ddots & \vdots \\ M_{N1} & M_{N2} & \cdots & I \end{bmatrix}$$

In the unified matrix $U_1$, each entity corresponds to a row vector. All the entities are represented in a unified space spanned by all the entities on the multiple-type graph G. An importance value $a_{ij}$ for each matrix $M_{ij}$ may be used, thus transforming $U_1$ to a weighted matrix U:

$$U_I = \begin{bmatrix} I & a_{12}M_{12} & \cdots & a_{1N}M_{1N} \\ a_{21}M_{21} & I & \cdots & a_{2N}M_{2N} \\ \vdots & \vdots & \ddots & \vdots \\ a_{N1}M_{N1} & a_{N2}M_{N2} & \cdots & I \end{bmatrix}$$

The search module 112 may search for each heterogeneous entity of the search query in the unified space such as $U_1$ or U, and may identify corresponding vectors for the entities. The vectors including multiple co-occurrence matrices may have relationships between one or more entity types. Each such vector may be used to retrieve results for the search.

The ranking module 114 may rank a set of search results retrieved by the search module 112 in order of relevance to the search query. The heterogeneous interrelated entities retrieved as results of the search may be ranked according to the similarity scores between the retrieved entities and the search query. Since every type of entity may be represented in the unified space, each pair of entities could have a similarity calculated by the dot product of their vectors. Therefore, the entities may be ranked based on a query that includes a list of entities. Specifically, the similarity between two entity vectors $o_1$ and $o_2$ may be given by:

$$S(o_1, o_2) = \sum_l o_{1,l} \cdot o_{2,l}$$

where $o_{1,l}(o_{2,l})$ is the l-th value in $o_1(o_2)$. Given a query $Q := [t_j : ID_j]_{j=1 \ldots k}$ in a heterogeneous interrelated entities search framework and given that $o_j$ is an entity vector corresponding to the j-th entity in Q, the similarity between Q and an entity vector o is calculated as:

$$Sim(Q, o) = \sum_{j=1}^{k} S(o_j, o)$$

Moreover, the similarity between Q and the entity vector o is represented as $Sim(Q, o) = S(q, o)$ where:

$$q = \sum_{j=1}^{k} o_j.$$

Thus, q is the vector representation of Q in the unified space. All the entities may then be ranked according to their similarity defined by the Sim(Q, o) equation, where o denotes the entity vector for each entity of the set of heterogeneous interrelated entities retrieved as the search result. Since each entity bears a type, the ranked list may be classified according to their types to thus obtain the heterogeneous interrelated search results as lists of entities.

In one implementation, the retrieved results of the search are categorized based on the entity types. Each entity type is presented as a list having all the entities of the same entity type. Each such list is then ranked by calculating the similarity scores between the entities of the list and the search query. In another implementation, the retrieved results of the search may as a whole be ranked by calculating the similarity scores between each entity of the search corresponding to the search query.

The unified framework facilitates inclusion of co-occurrence information within an entity type to better measure the similarity between two objects, as opposed to traditional models.

In traditional information retrieval, there are two types of objects involved: words and documents. In an extended vector space model, the unified matrix is the same as the U matrix described above. Therefore, the i-th word has a vector $w_i$ and the j-th document has a vector $d_j$ in the unified space. For m words and n documents $$d_{j,l} = \begin{cases} 0 & 1 \le l \le n, l \ne j \\ 1 & l = j \end{cases}$$

$$w_{j,l} = \begin{cases} 0 & n+1 \le l \le n+m, l \ne n+i \\ 1 & l = n+i \end{cases}$$

Given a query Q which have k words, let $w_i(r)$ be the vector corresponding to the r-th word in the query. Then, according to the Sim(Q, o) equation provided above, we get:

$$Sim(Q, d_j) = \sum_{r=1}^{k} S(w_{i(r)}, d_j)$$

$$= \sum_{r=1}^{k} \sum_{l=1}^{m+n} w_{i(r),l} \cdot d_{j,l}$$

$$= \sum_{r=1}^{k} \left( \sum_{l=1}^{n} w_{i(r),l} \cdot d_{j,l} \right) + \sum_{l=n+1}^{n+m} w_{i(r),l} \cdot d_{j,l}$$

-continued $$= \sum_{r=1}^{k} w_{i(r),j} + d_{j,i(r)+n}$$

Since U is symmetric, we have $d_{j,i(r)+n} = w_{i(r),j}$, which is the co-occurrence frequency of the i(r)-th word in the j-th document. We have $$Sim(Q, d_j) \alpha = \sum_{r=1}^{k} a_{i(r),j} \sum_{t \in Q} c(t, Q) \cdot a_{t,j}$$

Thus, it is the dot product between the query vector and document vector in a space spanned by words, which is the traditional similarity score used in vector space models. In addition, co-occurrence information within documents or co-occurrence information within words may be incorporated into the framework using the unified matrix, to better measure the similarity between two objects. For example, the hyperlinks between Web pages may be regarded as co-occurrence information and be included in the unified matrix.

The search results retrieved by the search module 112 may be refined using the feedback module 116. The feedback module 116 may be used for query expansion, which in turn is used for reformulating the input search query to improve retrieval performance in the information retrieval operations. Feedback may be combined with the entities of the search query 212 to help find semantically related heterogeneous entities 214. The set of semantically related entities 214 may either be judged by the users, or the top retrieval results may be used as pseudo feedback. Pseudo feedback learns from the few top-ranked documents found during a search and learns from them to improve retrieval accuracy.

The expanded query vector q̃ of q may be calculated using the following equation:

$$\tilde{q} = \alpha \cdot q + \beta \cdot \frac{1}{|C|} \sum_{o \in C} o$$

where α and β are the weighting factors. By considering the different types of entities in C, the expansion may be improved as:

$$\tilde{q} = \alpha \cdot q + \beta \cdot \sum_{i=1}^{N} \frac{\gamma_i}{|C_i|} \sum_{o \in C_i} o$$

where $C_i$ is the i-th type of feedback entities and $\gamma_i$ is to weigh different types of entities. A constraint $\Sigma_{i=1}^{N} \gamma_i = 1$ may be added. Since q̃ is still in the unified space, the expanded query may be used to retrieve all the entities again to get refined results.

Figure 3:
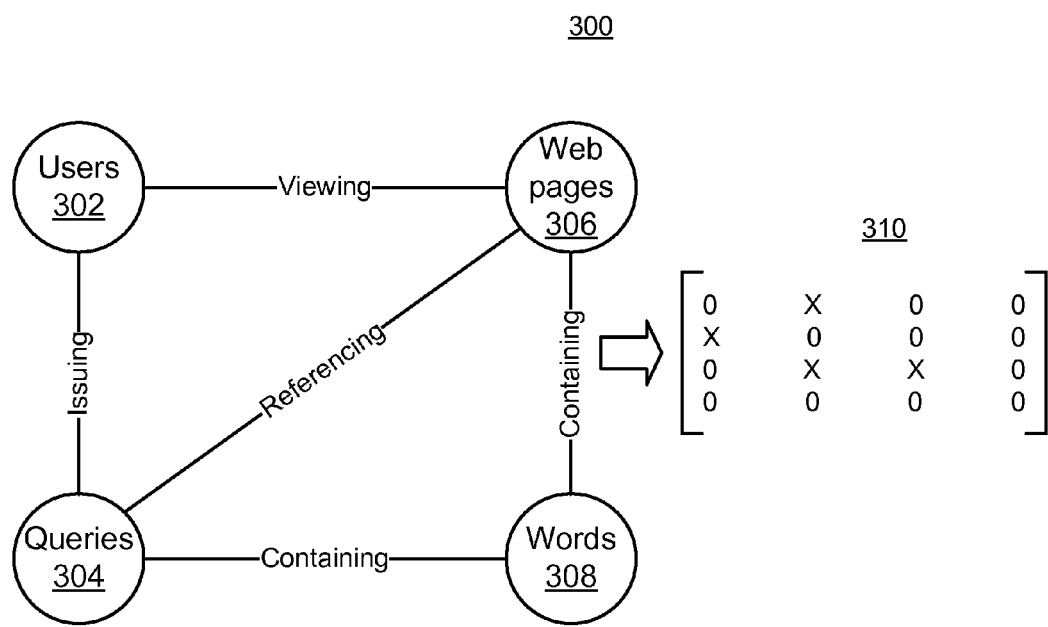
FIG. 3 illustrates a diagram of sample interactions between heterogeneous entity types and a sample co-occurrence matrix reflecting the interactions.

FIG. 3 shows an exemplary interaction diagram 300 between multiple entity types. The multiple entity types include users 302, queries 304, Web pages 306, and words 308. The entity types may interact as follows: users 300 issue queries 304; queries 304 reference Web pages 306; Web pages 306 include words 308; and so on. Each edge of diagram 300 denotes a single interaction relationship, which corresponds to a co-occurrence matrix 310.

A multiple-type graph G(V, E) including a set of vertices denoting entities and a set of edges denoting interactions may be constructed from the interaction information. The corresponding graph G includes 4 types of entities: users 302, queries 304, Web pages 306, and words 308. G includes 5 interaction relationships, and each of them is denoted by an edge in FIG. 3. In general, all the interaction relationships may be represented as co-occurrence matrices (e.g., the co-occurrence matrix 310) with each entry measuring the correlation strength between two corresponding entities. Five matrices corresponding to 5 co-occurrence relationships similar to the exemplary co-occurrence matrix 310 shown may thus represent the interaction between the entities. The various co-occurrence matrices may then be represented in a unified space as explained above with reference to FIG. 2.

Exemplary Methods

Exemplary methods for searching heterogeneous interrelated entities are described with reference to FIGS. 1-3. These exemplary methods may be described in the general context of computer executable instructions. Generally, computer executable instructions may include routines, programs, objects, components, data structures, procedures, modules, functions, and the like that perform particular functions or implement particular abstract data types. The methods may also be practiced in a distributed computing environment where functions are performed by remote processing devices that are linked through a communication network. In a distributed computing environment, computer executable instructions may be located both in local and remote computer storage media, including memory storage devices.

The exemplary methods are illustrated as a collection of blocks in a logical flow graph representing a sequence of operations that may be implemented in hardware, software, firmware, or a combination thereof. The order in which the methods are described is not intended to be construed as a limitation, and any number of the described method blocks may be combined in any order to implement the methods, or alternate methods. Additionally, one or more individual blocks may be omitted from each method without departing from the spirit and scope of the subject matter described herein. In the context of software, the blocks represent computer instructions that, when executed by one or more processors, perform the recited operations.

FIG. 4 illustrates an exemplary method 400 for implementing searching heterogeneous interrelated entities in a unified space on the computing device 106.

At 402, a multiple-type graph is constructed for all heterogeneous entity types. The multiple-type graph G (V, E) is made of N vertices with the i-th vertex corresponding to the i-th type of entities $X_i$. An interaction between two types of entities is shown as an edge $e_{ij} \in E$ connecting the i-th and j-th vertices.

At 404, for each interaction between two entities, a co-occurrence matrix is extracted that represents the correlation strength between the entities for each entry.

At 406, each entity of the plurality of heterogeneous entities is represented as a vector using co-occurrence matrices. Each entity may be represented in another entity's space using the co-occurrence matrices. This includes representing each entity having an entity type by a series of co-occurrence matrices of other entity types that may then be concatenated to form a unified vector. For cases where co-occurrence information is not available, an entity co-occurs with itself by default and may thus be replaced by an identity matrix.

At 408, a unified matrix is constructed using the entity vectors corresponding to heterogeneous entities. In one implementation, the search module 112 may construct the unified matrix. The search module 112 may represent each heterogeneous entity by several vectors. All entity vectors are concatenated to form the unified matrix corresponding to the unified space. Each row of the unified matrix is thus a vector representation of an entity. All the entities represented in the unified space correspond to all the entities on the multiple type graph G.

At 410, a search interface on the client device 102 is used to receive a heterogeneous entities search query as input to be processed by the computing device 106. The query may be a collection of multiple entities that may have different entity types. In one embodiment, each entity of the search query may be searched in the unified space. Based on the relevance of each heterogeneous entity and vectors corresponding to the entities, a set of search results may be retrieved. The search results may include multiple entities having one or more entity types.

Figure 5:
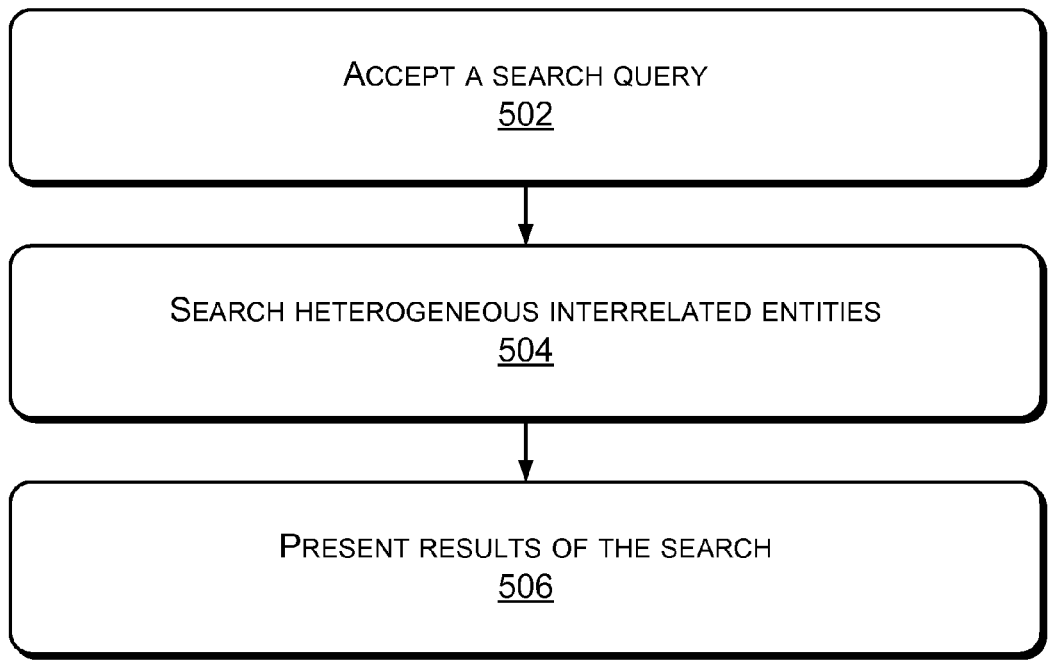
FIG. 5 illustrates exemplary method(s) for searching heterogeneous interrelated entities.

FIG. 5 illustrates an exemplary method 500 to perform a search of heterogeneous entities.

At 502, a user may input a query that is accepted by the search module 112. At 504, in response to the query, the search module may search multiple types of interrelated entities. The search module 112 described herein may allow a user conducting a search to retrieve results in the form of such heterogeneous interrelated entities using the unified space representation of the entities. At block 506, the results are presented as a list or series of lists of the heterogeneous interrelated entities. The results may be presented via various input/output interfaces, such as a graphical user interface (GUI), etc.

FIG. 6 illustrates another exemplary method 600 to perform a search of heterogeneous entities.

At 602, the search module 112 for searching heterogeneous interrelated entities may accept a search query. The search query may include multiple interrelated entities.

At 604, the search module 112 may perform a search in the unified space based on the multiple relationships between the entities. At block 606, the ranking module 114 ranks each entity corresponding to the set of search results and sorts the entities into lists according to type, similarity, date, or other criteria. The search results in the lists may then be reordered based on the ranking.

At 608, the ranked search results may be presented to the user using a graphical user interface.

FIG. 7 illustrates an exemplary method 700 to rank the set of heterogeneous interrelated entities retrieved as search results based on the similarity between the retrieved heterogeneous interrelated entities and the heterogeneous entities search query.

At 702, the search query is represented as a query vector in the unified matrix. In one implementation, the search module 112 constructs the query vector as a representation of the search query in the unified space.

At 704, pairs are formed between vectors of each heterogeneous interrelated entity returned as the search result and the search query vector. For example, if ten documents are returned from the search results, then entity vectors corresponding to the ten documents may form pairs one at a time with the search query vector. According to one implementation, the ranking module 114 forms the pairs of vectors.

At 706, a dot product is calculated for each pair of the entity vector and the search query vector to evaluate a similarity score. Thus, the ranking module 114 may calculate multiple similarity scores for each retrieved search result.

At 708, the heterogeneous interrelated entities retrieved as search results are ranked based on the similarity scores. For example, the entity having the highest similarity score may be ranked highest and, thus, be the first displayed search result.

FIG. 8 illustrates an exemplary method 800 to improve information retrieval using feedback. In one implementation, the method 800 may be performed by the feedback module 116 to calculate an expanded query from the heterogeneous entities search query and obtain a set of refined results.

At 802, a unified matrix is constructed for all the heterogeneous entities, which may have multiple entity types. The unified matrix represents the entities as vectors, which are based on the co-occurrence matrices of entity pairs.

At 804, a feedback mechanism is used to find a set of semantically interrelated entities. The calculation of the semantically interrelated entities may be based on interrelated entities selected by the users or may be based on the top few results retrieved by the search module 112 as pseudo feedback.

At 806, an expanded query is calculated using the heterogeneous interrelated search query, the set of semantically related entities, and a set of weighing factors that may be based on the entity types. The expanded query vector $\tilde{q}$ of q may calculated using the following equation:

$$\tilde{q} = \alpha \cdot q + \beta \cdot \frac{1}{|C|} \sum_{o \in C} o$$

where $\alpha$ and $\beta$ are the weighting factors. By considering the different types of entities in C, the expansion may be improved as:

$$\tilde{q} = \alpha \cdot q + \beta \cdot \sum_{i=1}^{N} \frac{\gamma_i}{|C_i|} \sum_{o \in C_i} o$$

where $C_i$ is the i-th type of feedback entities and $\gamma_i$ is to weigh different types of entities. A constraint $\Sigma_{i=1}^{N} \gamma_i = 1$ may be added. Since $\tilde{q}$ is still in the unified space, the expanded query may be used to retrieve all the entities again to get refined results.

At 808, the expanded query is used as the input search query to get refined results and to improve search accuracy. Thus, the original query vector may be replaced by the query vector of the expanded query to get refined results from the unified space.

FIG. 9 shows an example of the presentation of search results of heterogeneous interrelated entities such as paper, author, conference, and keyword entities for a search query "data mining".

The user interface 900 allows the user to input queries with different entity types and, in response, the system may return different interrelated entities as search results.

At block 902, multiple entity types such as keywords, conference, and author are used for taking a search query as input. In one embodiment, a user may input a search query having multiple entity types at the same time as the input. The search results for the heterogeneous entities search query may be represented as entities having one or more entity types such as papers, authors, conferences, and keywords, such as shown by 904. Results within each type of entity may be ordered by their relevance to the search query. These entities may also be represented as lists with each list corresponding to an entity type.

To facilitate user's information exploration, a hyperlink may be embedded under each entity descriptor. If the user clicks on the hyperlink, the system may take the corresponding entities as a new query and return all the relevant entities having a plurality of entity types.

FIG. 10 illustrates an example of the presentation of search results of heterogeneous interrelated entities including variations of the query and/or related queries, URL's, papers, and words.

The user interface 1000 takes a URL as input and the search module 112 returns bidding terms information, the URL's of its competitors, and also the potential customers (users) of its products/services. For example, the URL query may take "www.xbox.com" as input into the search module 112 and return results such as other words which could have been more appropriate as search query, related URL's, and other URL's which could give the same results.

Figure 11:
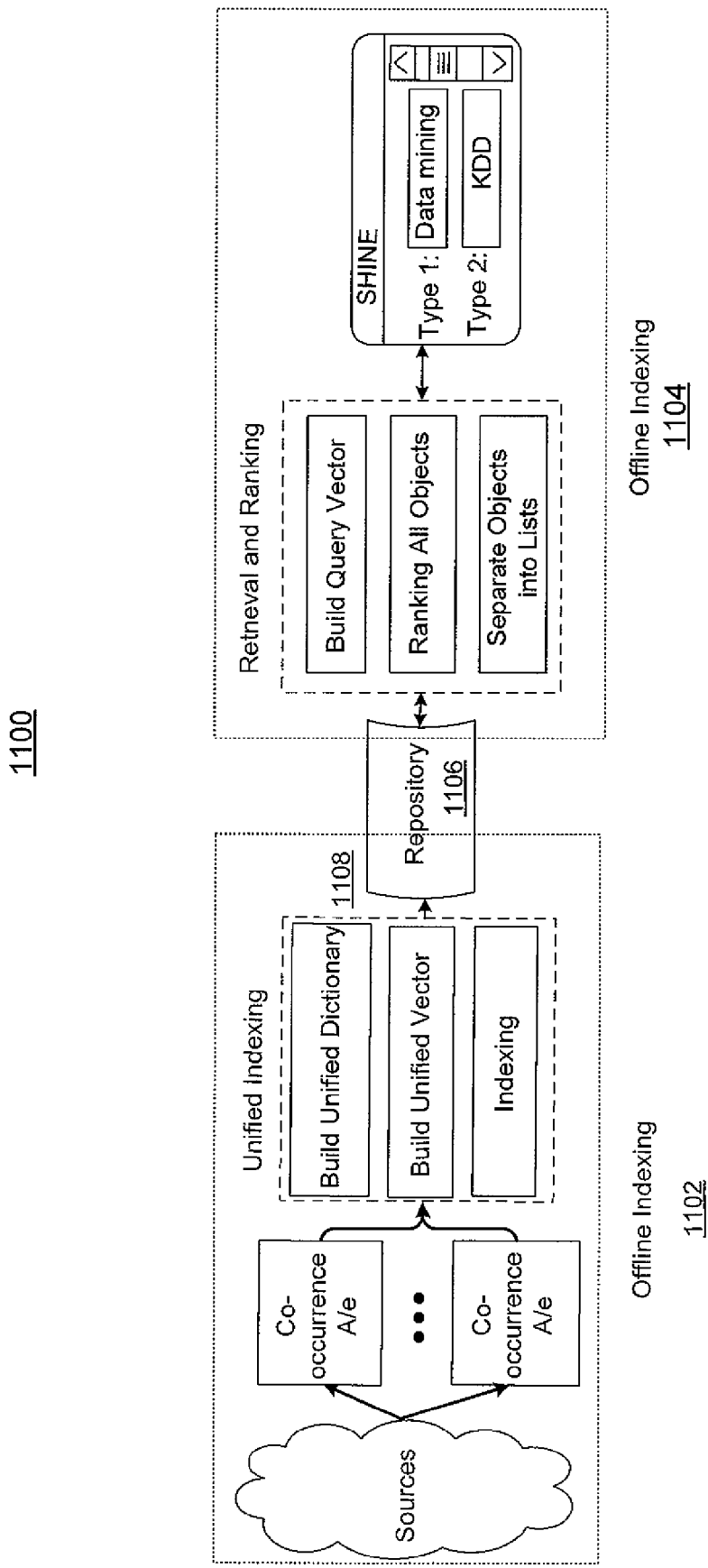
FIG. 11 shows a schematic diagram of an exemplary system for performing a search for heterogeneous interrelated entities.

FIG. 11 shows a schematic diagram of an exemplary system for performing a search for heterogeneous interrelated entities. A general architecture may be provided for searching heterogeneous interrelated entities. Different applications may be adapted with little or no modification. System 1100 generally involves two parts: offline indexing 1102 and online searching 1104.

At 1102, offline indexing is performed by the search module 112. The offline indexing part may be performed to extract different co-occurrence relationships from a multiple-type graph that is in turn derived from the raw sources such as search engine logs. After the co-occurrence relationships are obtained and represented in the form of co-occurrence matrices, unified indexing is built using the co-occurrence matrices and the data is pushed to a repository 1106.

At 1108, a unified matrix may be constructed to map each entity string to a unique identifier. This entity string corresponds to an entity vector that includes relationships between multiple entity types. This matrix may be used to build representations of each entity by finding all of its co-occurred entities. Each entity may be associated with an entity type indicator. All entities may then be indexed into the repository 1106.

At 1104, the online searching part may accept users' input, compose the input as a list of entities, and send it to the retrieval and ranking component. The retrieval component may rank all the entities according to their similarities to the query. Since each entity has an entity type, the ranking component also separates the returned entities into different ranking lists and returns them to the users.

The online search 1104 may be implemented by various modules spread across the client device 102 and the computing device 106. For example, an input/output interface on the client device 102 may be used to receive the search query and present search results to a user, The search module 112, ranking module 114 and feedback module 116 in the computing device 106 may perform the search and ranking operations.

CONCLUSION

Although description has been made in language specific to structural features and/or methodological steps, it is to be understood that the appended claims are not necessarily limited to the specific features or steps described. Rather, the specific features and steps are disclosed as examples. Additionally, it should be understood that certain acts in each method need not be performed in the order described, may be modified, and/or may be omitted entirely, depending on the circumstances.

Additionally, any of the acts described above with respect to any method may be implemented by a processor or other computing device based on instructions stored on one or more computer-readable media associated with the client machines. Computer-readable media can be any available media that can be accessed locally or remotely by the client machines. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the client machines.

What is claimed is:

1. A method implemented on a computing device by a processor for searching heterogeneous interrelated entities comprising:
    receiving a heterogeneous interrelated entities search query;
    searching, in a unified space, for results to the heterogeneous interrelated entities search query, the results including a set of heterogeneous interrelated entities having a plurality of entity types, the unified space based on one or more relationships between multiple heterogeneous entities;
    constructing a multiple-type graph for one or more heterogeneous entity types;
    extracting co-occurrence matrices from the multiple-type graph based on interactions between pairs of the one or more heterogeneous entity types;
    forming one or more entity vectors for each of the one or more heterogeneous entity types based on the co-occurrence matrices;
    concatenating the one or more entity vectors to form a unified matrix that represents the multiple heterogeneous entities in the unified space; and
    presenting the results as a plurality of lists, each list of the plurality of lists comprising search result entities of a same entity type.

2. The method of claim 1, wherein the heterogeneous interrelated entities search query comprises at least two heterogeneous entities having different entity types.

3. The method of claim 1, wherein the constructing the multiple-type graph comprises:
    identifying a set of vertices corresponding to the one or more heterogeneous entity types; and
    identifying a set of edges corresponding to a set of interaction relationships between the one or more heterogeneous entity types.

4. The method of claim 1, further comprising associating an importance value with the co-occurrence matrices to form a weighted matrix.

5. The method of claim 1, wherein each of the one or more entity vectors corresponds to a specific entity type of the one or more heterogeneous entity types.

6. The method of claim 1, wherein the concatenating comprises representing an element of the unified matrix with an identity matrix when the element represents a heterogeneous entity that co-occurs with itself.

7. The method of claim 1, further comprising ranking the results by:
    determining an entity vector for the set of heterogeneous interrelated entities based on the one or more relationships between the multiple heterogeneous entities;
    calculating a query vector for the heterogeneous interrelated entities search query;

pairing the entity vector with the query vector;
computing a similarity score for the entity vector that is paired with the query vector based on a dot product of the query vector and the entity vector; and
ranking the results based on the similarity score.

8. The method of claim 7, wherein the ranking the results classifies the results based on an entity type of the plurality of entity types.

9. The method of claim 1, further comprising utilizing feedback by:
identifying a set of semantically related entities based on the heterogeneous interrelated entities search query;
evaluating an expanded query vector based on the heterogeneous interrelated entities search query, the set of semantically related entities, and one or more weighting factors, the one or more weighing factor based on a heterogeneous entity type; and
determining refined results using the expanded query vector.

10. A computing-based device comprising:
a memory;
one or more processors operatively coupled to the memory;
a search module configured to:
receive a heterogeneous entities search query;
search for a set of heterogeneous interrelated entities having a plurality of entity types in a unified space based on the heterogeneous entities search query, the unified space based on one or more interactions between heterogeneous entities;
construct a multiple-type graph for the plurality of entity types;
derive co-occurrence matrices from the multiple-type graph based on the one or more interactions between the heterogeneous entities;
represent each of the heterogeneous entities as one or more entity vectors based on the co-occurrence matrices;
combine the one or more entity vectors to form a unified matrix that represents the unified space; and
present the set of heterogeneous interrelated entities as a plurality of lists corresponding to the plurality of entity types.

11. The computing-based device as recited in claim 10, further comprising a ranking module configured to:
extract one or more entity vectors for each entity of the set of heterogeneous interrelated entities based on the unified space, the one or more entity vectors further based on the one or more interactions between the heterogeneous entities;
compute a search query vector for the heterogeneous entities search query;
generate pairs of search query vectors with each entity of the set of heterogeneous interrelated entities;
calculate a dot product similarity score for each of the pairs of search query vectors; and
rank the set of heterogeneous interrelated entities based on the dot product similarity score.

12. The computing-based device as recited in claim 10, further comprising a feedback module configured to:
retrieve semantically related entities from a unified matrix based on the heterogeneous entities search query;
determine an expanded search query based on the semantically related entities, the heterogeneous entities search query, and a set of weighting factors, wherein the set of weighting factors are based on the set of heterogeneous interrelated entities; and
retrieve the heterogeneous interrelated entities from the unified matrix based on the expanded search query.

13. A tangible computer readable medium having a set of computer readable instructions that, when executed, perform acts comprising:
receiving a heterogeneous entities search query;
retrieving a set of heterogeneous interrelated entities comprised of multiple heterogeneous interrelated entities with one or more entity types in a unified space for the heterogeneous entities search query, the unified space based on interactions between the multiple heterogeneous interrelated entities;
constructing a multiple-type graph with the one or more entity types, wherein vertices of the multiple-type graph are based on the one or more entity types and edges of the multiple-type graph are based on the interactions between the multiple heterogeneous interrelated entities;
obtaining co-occurrence matrices from the multiple-type graph based on the interactions between the multiple heterogeneous interrelated entities;
generating one or more entity vectors for each of the multiple heterogeneous interrelated entities based on the co-occurrence matrices;
combining the one or more entity vectors to create a unified matrix that represents the multiple heterogeneous interrelated entities in the unified space; and
displaying the set of heterogeneous interrelated entities sorted according to the one or more entity types.

14. The computer readable medium as recited in claim 13, further comprising:
evaluating a search query vector for the heterogeneous entities search query;
determining entity vectors for the set of heterogeneous interrelated entities based on the interactions between the multiple heterogeneous interrelated entities;
computing a similarity score for one or more pairings of the search query vector and the entity vectors for one or more entities; and
ranking the set of heterogeneous interrelated entities based on the similarity score.

15. The computer readable medium as recited in claim 14, wherein the ranking the set of heterogeneous interrelated entities based on the similarity score further comprises categorizing the set of heterogeneous interrelated entities as lists based on the entity types.

16. The computer readable medium as recited in claim 13, further comprising:
recognizing a set of semantically related entities based on the heterogeneous entities search query;
calculating an expanded search query based on the set of semantically related entities, the heterogeneous entities search query and a set of weighting factors, wherein the set of weighting factors is based on the semantically related entities; and
searching the multiple heterogeneous interrelated entities based on the expanded search query.

* * * * *